(12) United States Patent
Kim et al.

(10) Patent No.: US 11,685,224 B2
(45) Date of Patent: Jun. 27, 2023

(54) COOLING SYSTEM FOR A VEHICLE

(71) Applicants: HYUNDAI MOTOR COMPANY, Seoul (KR); KIA CORPORATION, Seoul (KR)

(72) Inventors: Yeonho Kim, Seoul (KR); Wan Je Cho, Hwaseong-si (KR); Myunghwan Kim, Suwon-si (KR); Jeawan Kim, Gwangmyeong-si (KR); Jae Yeon Kim, Hwaseong-si (KR); Eon Soo Yun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 54 days.

(21) Appl. No.: 17/340,850

(22) Filed: Jun. 7, 2021

(65) Prior Publication Data
US 2022/0185061 A1 Jun. 16, 2022

(30) Foreign Application Priority Data
Dec. 15, 2020 (KR) .................. 10-2020-0175160

(51) Int. Cl.
*B60H 1/00* (2006.01)
*H01M 10/613* (2014.01)
(Continued)

(52) U.S. Cl.
CPC ..... *B60H 1/00278* (2013.01); *B60H 1/00392* (2013.01); *B60H 1/00885* (2013.01);
(Continued)

(58) Field of Classification Search
CPC ............ B60H 1/00278; B60H 1/00392; B60H 1/00885; B60H 2001/00307;
(Continued)

(56) References Cited

U.S. PATENT DOCUMENTS 10,118,460 B1 * 11/2018 Blatchley ............ B60H 1/00428
10,850,590 B2 12/2020 Lee et al.
(Continued)

FOREIGN PATENT DOCUMENTS

| KR | 20180065311 A | 6/2018 |
|----|----|----|
| KR | 20180065332 A | 6/2018 |
| KR | 20180065348 A | 6/2018 |

*Primary Examiner* — Tho V Duong
*Assistant Examiner* — Raheena R Malik
(74) *Attorney, Agent, or Firm* — Lempia Summerfield Katz LLC

(57) ABSTRACT

A cooling system for a vehicle includes a cooling apparatus including a radiator and a first water pump connected by a coolant line and circulating a coolant to the coolant line, a battery module provided on a battery coolant line selectively connected to the coolant line through a first valve, and a first chiller provided on the battery coolant line between the first valve and the battery coolant line. The first chiller is connected to a refrigerant line of the air-conditioning apparatus and is configured to heat-exchange the selective inflowed coolant with the refrigerant supplied from the air-conditioning apparatus to adjust a temperature of the coolant. The cooling system further includes an automatic driving controller connected to the coolant line so that the coolant is circulated inside, wherein the battery module or the automatic driving controller is cooled selectively by at least one cooling mode.

17 Claims, 5 Drawing Sheets

(51) Int. Cl.
*H01M 10/625* (2014.01)
*H01M 10/663* (2014.01)
*H01M 10/63* (2014.01)
*H01M 10/6551* (2014.01)
*H01M 10/6568* (2014.01)

(52) U.S. Cl.
CPC ....... *H01M 10/613* (2015.04); *H01M 10/625* (2015.04); *H01M 10/63* (2015.04); *H01M 10/6551* (2015.04); *H01M 10/6568* (2015.04); *H01M 10/663* (2015.04); *B60H 2001/00307* (2013.01); *B60H 2001/00928* (2013.01); *B60H 2001/00949* (2013.01); *H01M 2220/20* (2013.01)

(58) Field of Classification Search
CPC ........... B60H 2001/00928; B60H 2001/00949; H01M 10/613; H01M 10/625; H01M 10/63; H01M 10/6551; H01M 10/6568; H01M 10/663; H01M 2220/20
USPC ........................................ 62/259.2
See application file for complete search history.

(56) References Cited

U.S. PATENT DOCUMENTS

| | | | |
|---|---|---|---|
| 2019/0168569 A1* | 6/2019 | Lee | B60L 58/26 |
| 2019/0168570 A1 | 6/2019 | Lee et al. | |
| 2019/0291540 A1* | 9/2019 | Gutowski | B60H 1/32284 |
| 2019/0344636 A1* | 11/2019 | Lee | B60H 1/00921 |
| 2020/0031191 A1* | 1/2020 | Oh | B60K 1/00 |
| 2020/0198497 A1* | 6/2020 | Honjo | B60L 58/26 |
| 2020/0203787 A1* | 6/2020 | Honjo | H05K 7/20945 |
| 2020/0274210 A1* | 8/2020 | Bae | H01M 10/6568 |
| 2020/0333360 A1* | 10/2020 | Soh | H01M 10/63 |
| 2021/0061115 A1* | 3/2021 | Honjo | H01M 10/46 |
| 2021/0080027 A1* | 3/2021 | Schoeneman | B60H 1/00278 |
| 2021/0309069 A1* | 10/2021 | Kim | B60H 1/00485 |
| 2021/0379962 A1* | 12/2021 | Kim | B60H 1/00278 |
| 2022/0185061 A1* | 6/2022 | Kim | H01M 10/625 |

* cited by examiner

COOLING SYSTEM FOR A VEHICLE

CROSS-REFERENCE TO RELATED APPLICATION

This application claims priority to and the benefit of Korean Patent Application No. 10-2020-0175160 filed in the Korean Intellectual Property Office on Dec. 15, 2020, the entire contents of which are incorporated herein by reference.

BACKGROUND

(a) Field of the Disclosure

The present disclosure relates to a cooling system for a vehicle. More particularly, the present disclosure relates to a cooling system for a vehicle for efficiently controlling an autonomous driving controller in communication with a cooling apparatus circulating a coolant and an air-conditioning device circulating a refrigerant in an autonomous vehicle.

(b) Description of the Related Art

In general, an air-conditioning system to control an indoor, i.e., interior temperature of a vehicle is provided in the vehicle.

The air-conditioning system maintains an interior temperature of the vehicle at an appropriate temperature regardless of a change in an outside temperature, maintains a pleasant interior environment, and is configured to heat or cool the interior of the vehicle by heat exchange. Heat exchange occurs by an evaporator in a process in which a refrigerant discharged by driving a compressor passes through a condenser, a receiver drier, an expansion valve, and an evaporator, and is then circulated to the compressor again.

In other words, in a cooling mode in summer, in the air conditioning system, a high-temperature and high-pressure gas phase refrigerant compressed by the compressor is condensed through the condenser and then is evaporated in the evaporator through the receiver drier and the expansion valve to decrease an interior temperature and humidity.

On the other hand, development of autonomous vehicles has recently been undertaken, and a radar, a lidar, a GPS, etc. required for autonomous driving, various sensors, and a control device controlling them are present in such vehicles.

However, in the above-described autonomous vehicle, a separate cooling system for cooling the control device, of which a calorific value (i.e. an amount of energy required to cool the control device) is relatively large, is required along with the air-conditioning system for cooling or heating the interior of the vehicle. Accordingly, there are drawbacks in the above-described autonomous vehicle in that cost increases and it is difficult to secure a space for installing the cooling system inside the narrow vehicle.

Also, a size and a weight of a cooling module mounted on the vehicle are increased. Also, there is a problem that a layout of connection pipes supplying a refrigerant or a coolant to the cooling apparatus, the air-conditioning apparatus, and the cooling apparatus of the autonomous driving controller is complicated inside the narrow engine compartment.

The above information disclosed in this Background section is only to enhance understanding of the background of the disclosure. Therefore, the Background section may contain information that does not form the prior art that is already known in this country to a person of ordinary skill in the art.

SUMMARY

Therefore, the present disclosure is provided to solve the above-described problem. An object of the present disclosure is to provide a cooling system for a vehicle for efficiently controlling an autonomous driving controller in communication with a cooling apparatus circulating a coolant and an air-conditioning device circulating a refrigerant in an autonomous vehicle.

A cooling system fora vehicle according to an embodiment of the present disclosure includes: a cooling apparatus including a radiator and a first water pump connected by a coolant line and circulating a coolant to the coolant line: a battery module provided on a battery coolant line selectively connected to the coolant line through a first valve; and a first chiller provided on the battery coolant line between the first valve and the battery module. The first chiller is connected to a refrigerant line of the air-conditioning apparatus and configured to heat-exchange the selective inflowed coolant with the refrigerant supplied from the air-conditioning apparatus to adjust a temperature of the coolant. The cooling system further includes an automatic driving controller connected to the coolant line so that the coolant is circulated inside. The battery module or the automatic driving controller is cooled selectively by at least one cooling mode.

The cooling system may further include a first branched line selectively connecting the battery coolant line through the operation of the first valve so that the first chiller and the battery module form an independent closed and sealed circuit through the battery coolant line. The cooling system may also include a second branched line selectively dividing the coolant line and the battery coolant line.

One end of the first branched line may be connected to the first valve. The other end of the first branched line may be connected to a position where the coolant line and the battery coolant line are connected between the second branched line and the battery module.

One end of the second branched line may be connected to the coolant line between the radiator and the first valve. The other end of the second branched line may be connected to the coolant line between the first water pump and the first branched line.

The automatic driving controller may be provided on the coolant connection line connected to the coolant line through the second valve.

At least one cooling mode may include: a first cooling mode cooling both the battery module and the automatic driving controller by using the coolant cooled in the radiator; a second cooling mode cooling the automatic driving controller by using the coolant cooled in the radiator and cooling the battery module by using the coolant cooled in the first chiller; and a third cooling mode cooling the battery module by using the coolant cooled in the radiator and independently cooling the automatic driving controller.

In the first cooling mode, the first branched line may be closed through the operation of the first valve and the second branched line may be closed. The coolant line and the battery coolant line may be mutually connected, and the coolant line and the coolant connection line may be connected through the operation of the second valve.

In the second cooling mode, the first branched line may be opened through the operation of the first valve and the second branched line may be opened. The connection of the coolant line and the battery coolant line may be closed by the opened first and second branched lines. The opened first branched line may be connected to the battery coolant line to form an independent closed and sealed circuit and the coolant line and the coolant connection line may be connected through the operation of the second valve.

In the third cooling mode, the first branched line may be closed through the operation of the first valve and the second branched line may be closed. The coolant line and the battery coolant line may be mutually connected, and the connection of the coolant line and the coolant connection line may be closed so that each of the coolant line and the coolant connection line forms an independent closed and sealed circuit through the operation of the second valve.

In the battery coolant line, a second water pump may be provided.

In the coolant connection line, a third water pump may be provided between the second valve and the automatic driving controller.

A second chiller connected to the air-conditioning apparatus through the refrigerant line may be provided on the coolant connection line between the third water pump and the automatic driving controller.

At least one cooling mode may further include a fourth cooling mode cooling the battery module by using the coolant cooled in the first chiller and cooling the automatic driving controller by using the coolant cooled in the second chiller.

In the fourth cooling mode, the first branched line may be opened through the operation of the first valve and the second branched line may be closed. The connection of the coolant line and the coolant connection line may be closed through the operation of the second valve. The opened first branched line may be connected to the battery coolant line to form an independent closed and sealed circuit and the coolant connection line may form an independent closed and sealed circuit. The first chiller may cool the coolant circulating through the battery coolant line by using the refrigerant supplied through the refrigerant line from the air-conditioning apparatus to be supplied to the battery module. The second chiller may cool the coolant circulating through the coolant connection line by using the refrigerant supplied from the air-conditioning apparatus through the refrigerant line to be supplied to the automatic driving controller.

In the second cooling mode, the air-conditioning apparatus may open the refrigerant line connected to the first chiller and close the refrigerant line connected to the second chiller.

In the third cooling mode, the air-conditioning apparatus may close the refrigerant line connected to the first chiller and open the refrigerant line connected to the second chiller.

The first and second chillers may each be a heat-exchanger of a water-cooled manner.

The first valve may be a 3-way valve and the second valve may be a 4-way valve.

As above-described, the cooling system for the vehicle according to an embodiment of the present disclosure may efficiently cool the automatic driving controller by using the coolant in communication with the cooling apparatus circulating the coolant and the air-conditioning apparatus circulating the refrigerant in an autonomous driving vehicle. The entire system and the layout of the piping are thereby simplified.

Also, by applying at least one chiller for lowering the temperature of the coolant by using the refrigerant circulating in the air-conditioning apparatus, the cooling system of the present disclosure may cool the battery module and the automatic driving controller more efficiently by using the low temperature coolant.

In addition, by efficiently cooling the battery module or the automatic driving controller by implementing the various cooling modes according to the temperature; the operation condition, or the external environment of each of the battery module and the automatic driving controller, the cooling system of the present disclosure may improve the durability and performance of each constituent element.

Furthermore, the present cooling system may improve overall marketability of the vehicle and customer satisfaction.

DETAILED DESCRIPTION OF THE EMBODIMENTS

Figure 1:
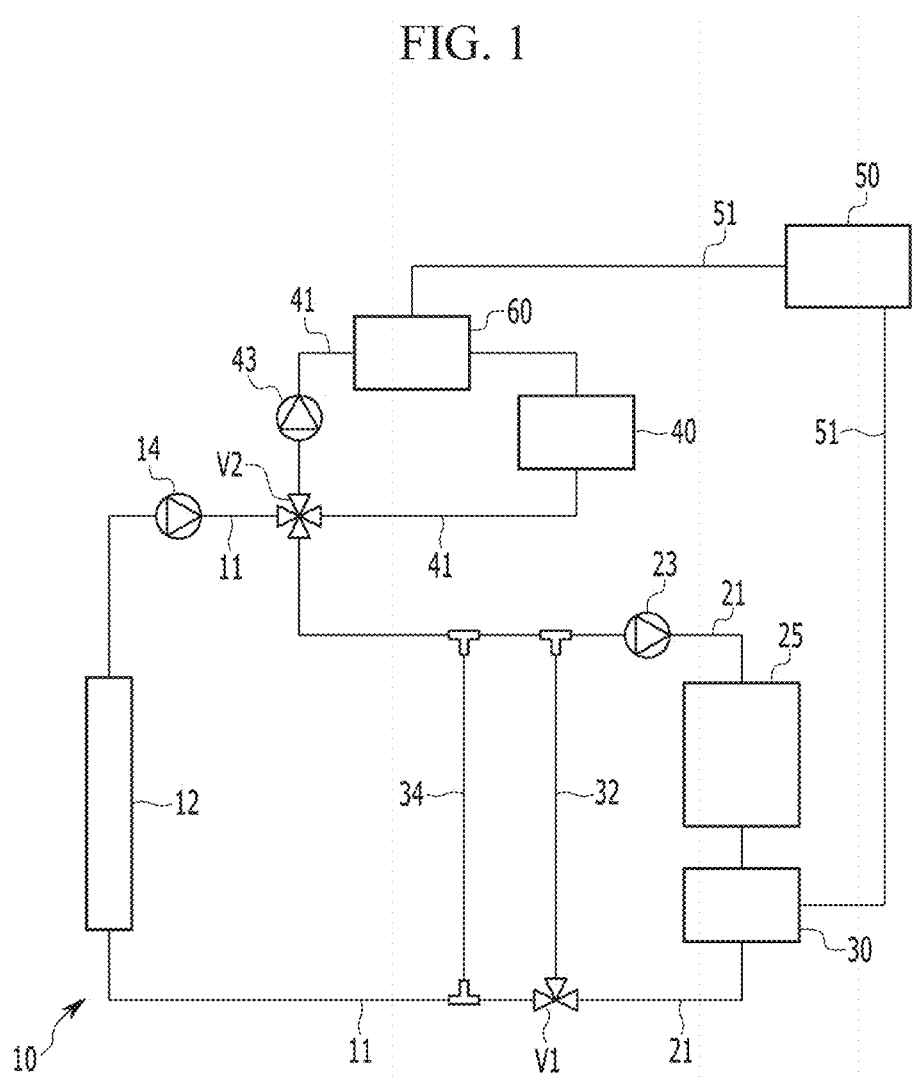
FIG. 1 is a block diagram of a cooling system for a vehicle according to an embodiment of the present disclosure.

An embodiment of the present disclosure is hereinafter described in detail with reference to the accompanying drawings.

Prior to the detailed description, while the cooling system of this disclosure is described in connection with what are presently considered to be several practical embodiments, it should be understood that the disclosure is not limited to the disclosed embodiments. On the contrary, the present disclosure is intended to cover various modifications and equivalent arrangements included within the spirit and scope of the appended claims.

Components unrelated to the description have been omitted in order to clearly describe the cooling system of the present disclosure. Also, like reference numerals are used to describe like components throughout the present specification.

Further, in the drawings, the sizes and the thicknesses of the components are provided for the convenience of description, but the scope of the present disclosure is not limited to those shown in the drawings. Also, the thicknesses may be exaggerated to clearly show several parts and regions.

Throughout this specification and the claims which follow, unless explicitly described to the contrary, the word "comprise", and variations such as "comprises" or "comprising", should be understood to imply the inclusion of stated elements but not the exclusion of any other elements.

In addition, the terms "... unit", "... means", "... part", and "... member" described in the specification mean units of a general configuration performing at least one function or operation. When a component, device, element, or the like of the present disclosure is described as having a purpose or performing an operation, function, or the like, the component, device, or element should be considered herein as being "configured to" meet that purpose or to perform that operation or function. Also, the controller and other components described herein may include a processor and a memory for meeting the noted purpose or performing the noted operation or function.

FIG. 1 is a block diagram of a cooling system for a vehicle according to an embodiment of the present disclosure.

Referring to FIG. 1, a cooling system for a vehicle according to an embodiment of the present disclosure is applied to an autonomous driving vehicle.

In the vehicle, a radar, a lidar, a global positioning system (GPS) required for the autonomous driving, and various sensors are provided. An automatic driving controller 40 for controlling these pieces of equipment is also provided.

Also, in the vehicle, a cooling apparatus 10 for cooling an electrical component or a battery module 25 by using a coolant and an air-conditioning apparatus 50 for cooling or heating a vehicle interior are provided.

Here, the battery module 25 or the automatic driving controller 40 may be selectively cooled by at least one cooling mode.

In other words, referring to FIG. 1, the cooling system includes a cooling apparatus 10, the battery module 25, a first chiller 30, and the automatic driving controller 40.

First, the cooling apparatus 10 includes a radiator 12 and a first water pump 14 by a coolant line 11. The cooling apparatus 10 circulates a coolant to the coolant line 11 through the operation of the first water pump 14 to cool an electrical component (not shown) or the battery module 25.

The radiator 12 is disposed in the front of the vehicle, and a cooling fan (not shown) is provided at the rear of the radiator 12 and cools the coolant through the operation of the cooling fan and heat exchange with outside air.

The battery module 25 is provided in a battery coolant line 21, which is selectively connected to the coolant line 11 through a first valve V1.

Here, the first valve V1 may selectively connect the coolant line 11 and the battery coolant line 21 between the radiator 12 and the battery module 25.

The battery module 25 may be formed in a water-cooled manner that supplies power to the electrical component (not shown) and is cooled by the coolant flowing along the battery coolant line 21.

In other words, the battery module 25 is selectively connected to the cooling apparatus 10 through the battery coolant line 21 according to the operation of the first valve V1. The battery module 25 may have the coolant circulated therein through the operation of a second water pump 23 provided in the battery coolant line 21.

The second water pump 23 is provided on the battery coolant line 21. This second water pump 23 may operate to circulate the coolant through the battery coolant line 21.

In the present embodiment, the first chiller 30 is provided in the battery coolant line 21 so that the coolant passes through it and is connected to a refrigerant line 51 of an air-conditioning apparatus 50.

The first chiller 30 may heat-exchange the coolant selectively inflowing therein with the refrigerant supplied from the air-conditioning apparatus 50 to control the temperature of the coolant. Here, the first chiller 30 may be a water-cooled heat-exchange device into which the coolant flows.

Here, in the battery coolant line 21, a first branched line 32 connecting the battery coolant line 21 between the first chiller 30 and the battery module 25 through the first valve V1 may be provided.

The first branched line 32 may selectively connect the battery coolant line 21 through the operation of the first valve V1 so that the first chiller 30 and the battery module 25 form an independent closed and sealed circuit through the battery coolant line 21.

In other words, one end of the first branched line 32 is connected to the first valve V1. Also, the other end of the first branched line 32 may be connected to the position where the coolant line 11 and the battery coolant line 21 are connected between the second branched line 34 and the battery module 25.

In addition, in the coolant line 11, a second branched line 34 that selectively separates the battery coolant line 21 and the coolant line 11 is provided.

The second branched line 34 may be selectively connected to the coolant line 11 so that the cooling apparatus 10 forms the independent closed and sealed circuit through the coolant line 11.

In other words, one end of the second branched line 34 is connected to the coolant line 11 between the radiator 12 and the first valve V1. Also, the other end the second branched line 34 may be connected to the coolant line 11 between the first water pump 14 and the first branched line 32.

Meanwhile, a separate valve may be provided at a point where the second branched line 34 crosses the coolant line 11 and the battery coolant line 21, or on the second branched line 34. This valve may be a 3-way or 2-way valve.

In the present embodiment, the first valve V1 selectively connects the coolant line 11 and the battery coolant line 21 or selectively connects the battery coolant line 21 and the first branched line 32 to control the flow of the coolant.

Here, the first valve V1 may be a 3-way valve.

In other words, when cooling the battery module 25 by using the coolant cooled in the radiator 12, the first valve V1 may connect the coolant line 11 connected to the radiator 12 and the battery coolant line 21 and close the first branched line 32.

Also, when cooling the battery module 25 by using the refrigerant and the heat-exchanged coolant, the first valve V1 may open the first branched line 32 and close the connection of the coolant line 11 and the battery coolant line 21.

Accordingly, the coolant of the low temperature in which the heat-exchange is completed with the refrigerant in the first chiller 30 is inflowed to the battery module 25 through the first branched line 32 opened by the first valve V1, thereby cooling the battery module 25 efficiently.

On the other hand, in the present embodiment, it is described that a valve is not configured in the second branched line 34, but a valve may be applied as necessary for the selective opening of the second branched line 34.

In other words, the second branched line 34 may control the flow rate of the coolant circulated through the coolant line 11, the battery coolant line 21, and the first branched line 32 all of which may be selectively connected according to various cooling modes and the operation of the first and second water pumps 14 and 23. Accordingly, opening/closing of the second branched line 34 is possible.

Also, the automatic driving controller 40 may be connected to the coolant line 11 so that the coolant circulates inside.

Here, the automatic driving controller 40 is provided on a coolant connection line 41 connected to the coolant line 11 through a second valve V2. The second valve V2 may be a 4-way valve.

On the coolant connection line 41, a third water pump 43 may be provided between the second valve V2 and the automatic driving controller 40.

A third water pump 43 may be operated to allow the coolant to circulate through the coolant connection line 41.

Also, between the third water pump 43 and the automatic driving controller 40, a second chiller 60 connected to the air-conditioning apparatus 50 through the refrigerant line 51 may be provided on the coolant connection line 41.

This second chiller 60 heat-exchanges the coolant selectively inflowing inside with the refrigerant supplied from the air-conditioning apparatus 50, thereby controlling the temperature of the coolant. Here, the second chiller 60 may be a water-cooled heat-exchange device in which a coolant is inflowed inside.

Meanwhile, the air-conditioning apparatus 50 may include a compressor, a condenser, an expansion valve, and an evaporator connected to the refrigerant line 51 to cool or heat the interior of the vehicle by using thermal energy generated as the refrigerant phase-changes.

The compressor compresses the refrigerant and the condenser condenses the refrigerant compressed by the compressor. The expansion valve expands the refrigerant condensed in the condenser and the evaporator evaporates the expanded refrigerant.

This evaporator is provided inside an HVAC module (Heating, Ventilation, and Air Conditioning, not shown) provided in the vehicle.

Also, at least one cooling mode may include first, second, third, and fourth cooling modes.

First, the first cooling mode may cool both the battery module 25 and the automatic driving controller 40 by using the coolant cooled by the radiator 12.

The second cooling mode may cool the automatic driving controller 40 by using the coolant cooled in the radiator 12 and may cool the battery module 35 by using the coolant cooled in the first chiller 30.

The third cooling mode may cool the battery module 25 by using the coolant cooled by the radiator 12 and cool the automatic driving controller 40 independently.

In other words, in the third cooling mode, the automatic driving controller 40 may be cooled by using the coolant cooled through heat-exchange with the refrigerant while passing through the second chiller 60 apart from the coolant circulating in the cooling apparatus 10.

The fourth cooling mode may cool the battery module 25 by using the coolant cooled in the first chiller 30 and may cool the automatic driving controller 40 by using the coolant cooled in the second chiller 60.

Hereafter, an operation for each cooling mode in a cooling system for a vehicle according to an embodiment of the present disclosure is described in detail with reference to FIGS. 2-5.

First, the operation for the first cooling mode is described with reference to FIG. 2 attached.

Figure 2:
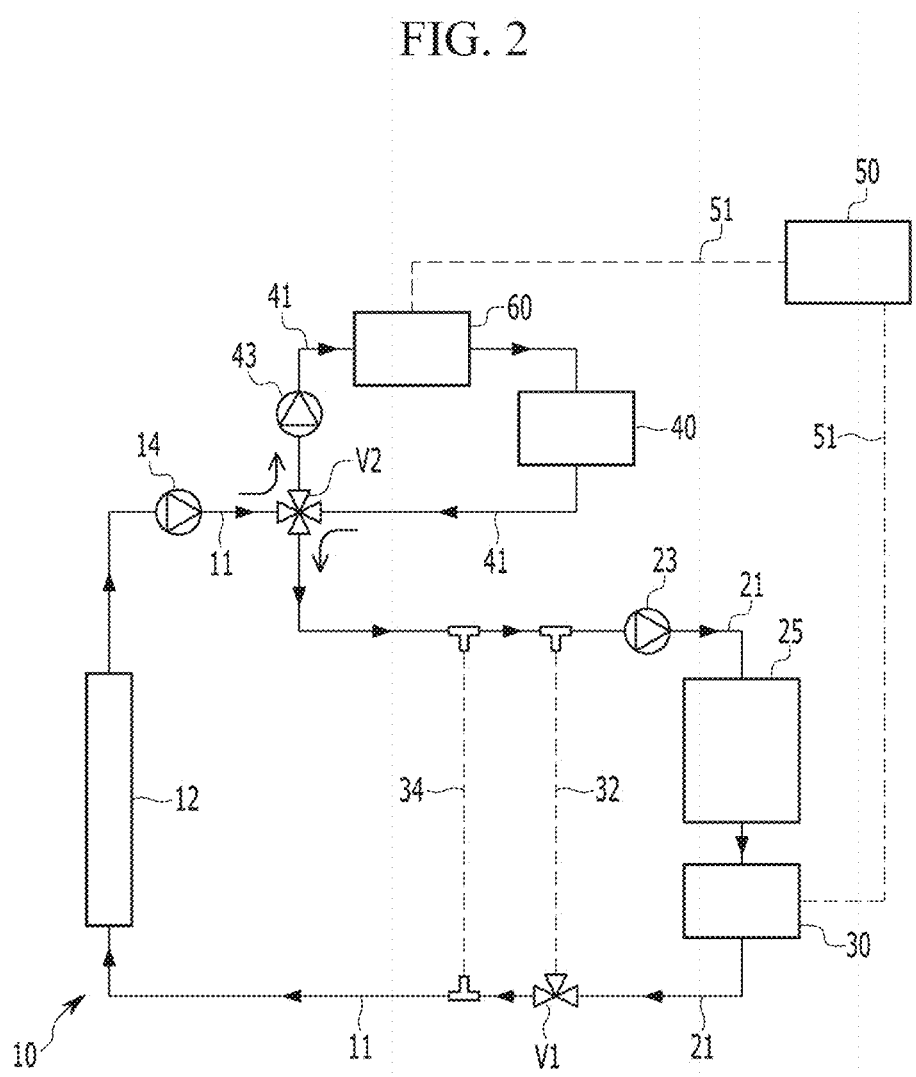
FIG. 2 is a view of an operation state according to a first cooling mode in a cooling system for a vehicle according to an embodiment of the present disclosure.

FIG. 2 is a view of an operation state depending on a first cooling mode in a cooling system for a vehicle according to an embodiment of the present disclosure.

Referring to FIG. 2, in the first cooling mode, the first branched line 32 is closed through the operation of the first valve V1. Also, the second branched line 34 is closed.

Accordingly, the coolant line 11 and the battery coolant line 21 are connected to each other by the closed first and second branched lines 32 and 34.

In other words, the coolant line 11 and the battery coolant line 21 are connected to each other by the selective operation of the first valve V1, and one closed and sealed circuit in which the coolant circulates may be formed.

Here, the coolant line 11 and the coolant connection line 41 are connected through the operation of the second valve V2.

Accordingly, the coolant cooled in the radiator 12 may circulate along the coolant line 11 and the battery coolant line 21 through the operation of the first water pump 14 and the second water pump 23.

In other words, the cooled coolant exhausted from the radiator 12 inflows to the battery module 25 along the battery coolant line 21 and cools the battery module 25.

The coolant that has cooled the battery module 25 passes through the first chiller 30 along the battery coolant line 21 and then flows back to the radiator 12 through the coolant line 11.

Meanwhile, the coolant cooled in the radiator 12 may inflow to the coolant connection line 41 connected to the coolant line 11 through the operation of the second valve V2 and may circulate the coolant connection line 41 through the operation of the third water pump 43.

Accordingly, the cooled coolant exhausted from the radiator 12 inflows to the automatic driving controller 40 along the coolant connection line 41 and cools the automatic driving controller 40.

In other words, the low temperature coolant cooled by radiator 12 can efficiently cool the battery module 25 and the automatic driving controller 40.

Meanwhile, the refrigerant line 51 connected to the first and second chillers 30 and 60 may be closed.

In the present embodiment, the operation of the second cooling mode is described with reference to FIG. 3 attached.

Figure 3:
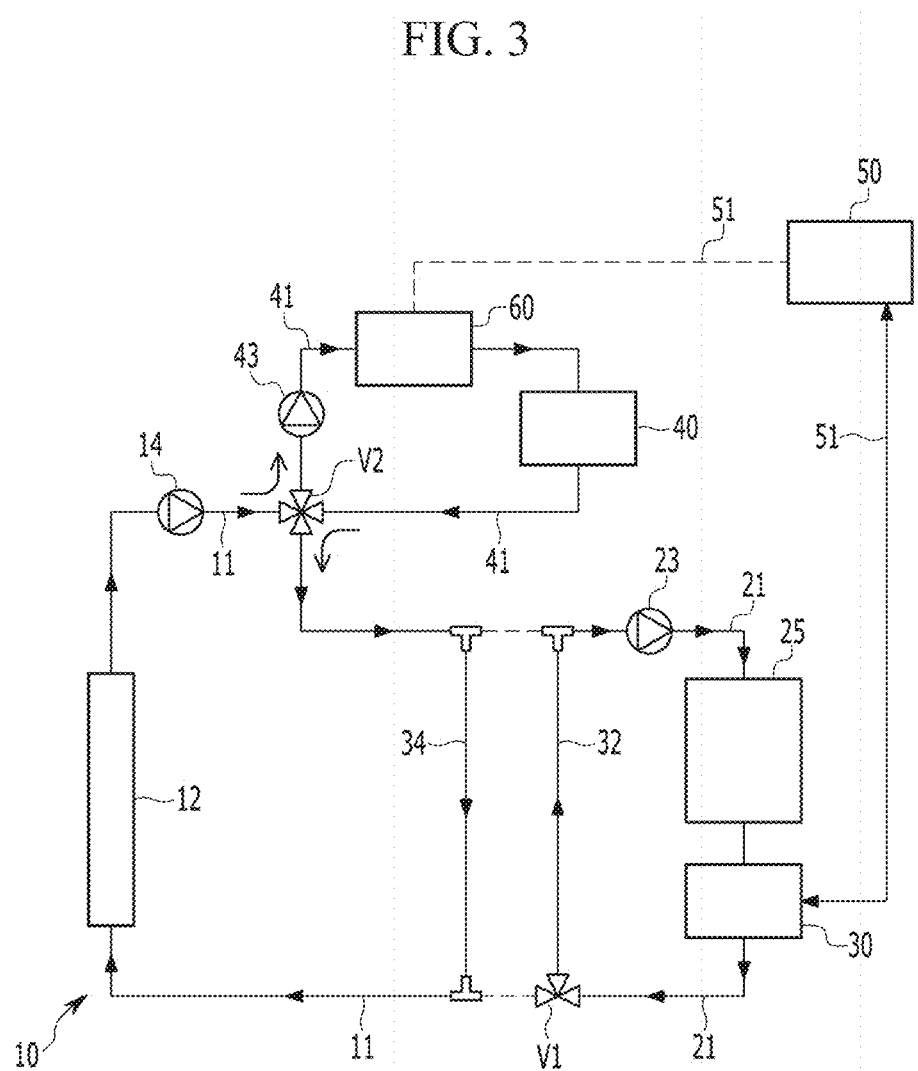
FIG. 3 is a view of an operation state according to a second cooling mode in a cooling system for a vehicle according to an embodiment of the present disclosure.

FIG. 3 is a view of an operation state of a second cooling mode in a cooling system for a vehicle according to an embodiment of the present disclosure.

Referring to FIG. 3, in the second cooling mode, the first branched line 32 is opened through the operation of the first valve V1. Also, the second branched line 34 is opened.

Accordingly, the coolant line 11 closes the connection with the battery coolant line 21 through the operation of the opened first and second branched lines 32 and 34 and the first valve V1.

In other words, in the cooling apparatus 10, the opened second branched line 34 is connected to the coolant line 21 to form a closed and sealed circuit in which the coolant is circulated independently.

Here, the coolant line 11 and the coolant connection line 41 may be connected through the operation of the second valve V2.

The battery coolant line 21 may form a closed and sealed circuit in which the coolant is circulated independently through the opened first branched line 32.

In other words, the coolant cooled in the radiator 12 circulates through the coolant line 11, the second branched line 34, and the coolant connection line 41 to cool the automatic driving controller 40 through the operation of the first water pump 14 and the third water pump 43.

Therefore, the automatic driving controller 40 may be efficiently cooled by the coolant cooled in the radiator 12.

In addition, the coolant circulating along the battery coolant line 21 through the operation of the second water pump 23 passes through the first chiller 30. Then, the coolant passing through the first chiller 30 may circulate through the battery coolant line 21 and the first branched line 32 to cool the battery module 25.

Meanwhile, the air-conditioning apparatus 50 may open the refrigerant line 51 connected to the first chiller 30. At the same time, the air-conditioning apparatus 50 may close the refrigerant line 51 connected to the second chiller 60.

Accordingly, the coolant circulating in the battery coolant line 21 is cooled through the heat-exchange with the refrigerant supplied to the first chiller 30. The coolant cooled in the first chiller 30 is supplied to the battery module 25. Accordingly, the battery module 25 is cooled by the cooled coolant.

In other words, the coolant circulating in the coolant line 11, the coolant connection line 41, and the second branched line 34, and the coolant passing through the first chiller 30 along the battery coolant line 21 and the first branched line 32, may efficiently cool the battery module 25 and the automatic driving controller 40 while repeatedly performing the same operation as described above.

In the present embodiment, the operation of the third cooling mode is described with reference to FIG. 4 attached.

Figure 4:
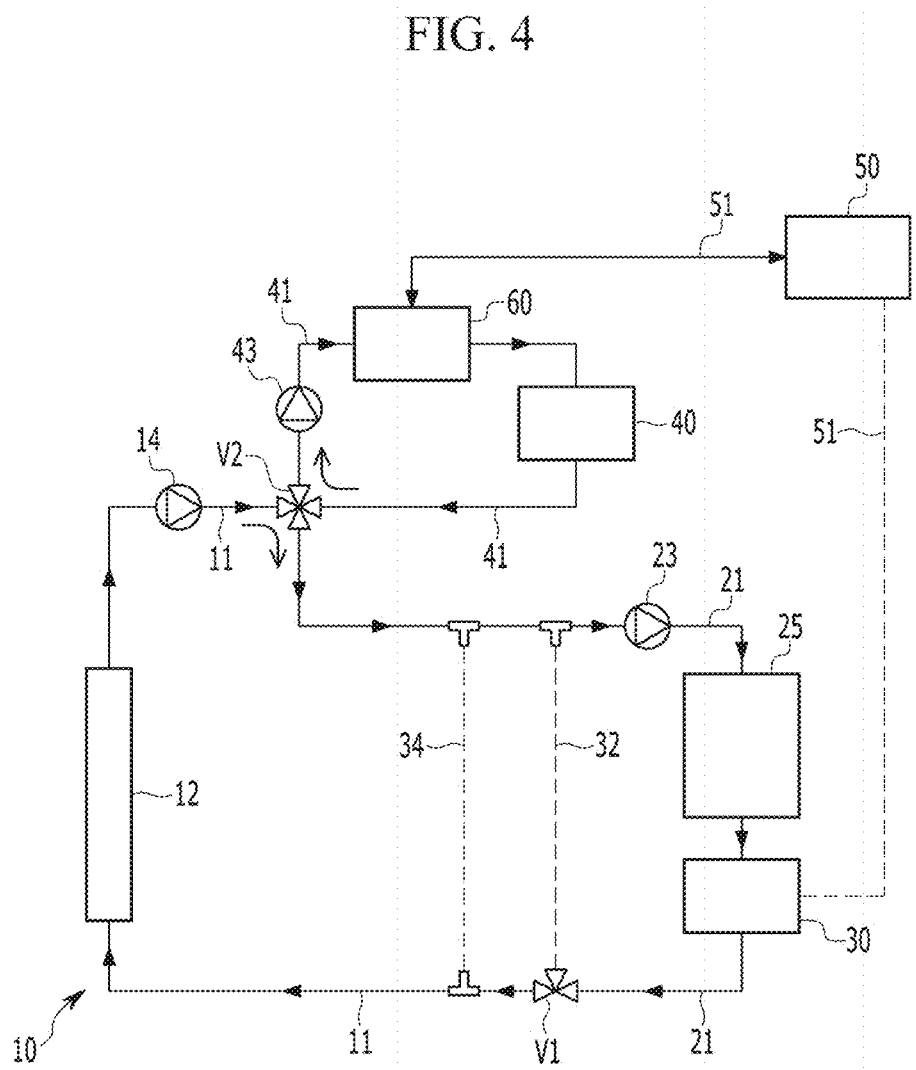
FIG. 4 is a view of an operation state according to a third cooling mode in a cooling system for a vehicle according to an embodiment of the present disclosure.

FIG. 4 is a view of an operation state depending on a third cooling mode in a cooling system for a vehicle according to an embodiment of the present disclosure.

Referring to FIG. 4, in the third cooling mode, the first branched line 32 is closed through the operation of the first valve V1. Also, the second branched line 34 is closed.

Accordingly, the coolant line 11 and the battery coolant line 21 are interconnected to each other by the closed first and second branched lines 32 and 34.

In other words, the coolant line 11 and the battery coolant line 21 are connected to each other by the selective operation of the first valve V1 and one closed and sealed circuit in which the coolant circulates may be formed.

Accordingly, the coolant cooled in the radiator 12 may circulate along the coolant line 11 and the battery coolant line 21 through the operation of the first water pump 14 and the second water pump 23.

In other words, the cooled coolant exhausted from the radiator 12 inflows to the battery module 25 along the coolant line 11 and the battery coolant line 21 and cools the battery module 25.

The coolant that cooled the battery module 25 flows back to the radiator 12 along the battery coolant line 21 and the coolant line 11.

Meanwhile, the connection between the coolant line 11 and the coolant connection line 41 is closed so that the coolant line 11 and the coolant connection line 41 form independent closed and sealed circuits through the operation of the second valve V2.

Accordingly, the coolant circulating along the coolant connection line 41 through the operation of the third water pump 43 passes through the second chiller 60. Then, the coolant passing through the second chiller 60 may circulate through the coolant connection line 41 to cool the automatic driving controller 40.

Meanwhile, the air-conditioning apparatus 50 may close the refrigerant line 51 connected to the first chiller 30 and open the refrigerant line 51 connected to the second chiller 60.

Then, the coolant circulating through the coolant connection line 41 is cooled through the heat-exchange with the refrigerant supplied to the second chiller 60. The coolant cooled in the second chiller 60 is supplied to the automatic driving controller 40. Accordingly, the automatic driving controller 40 may be efficiently cooled by the cooled coolant.

In other words, the coolant that circulates through the coolant line 11 and the battery coolant line 21 and the coolant that has passed the second chiller 60 along the coolant connection line 41 may efficiently cool the battery module 25 and the automatic driving controller 40 while repeatedly performing the operation as described above.

In the present embodiment, the operation of the fourth cooling mode is described with reference to FIG. 5 attached.

Figure 5:
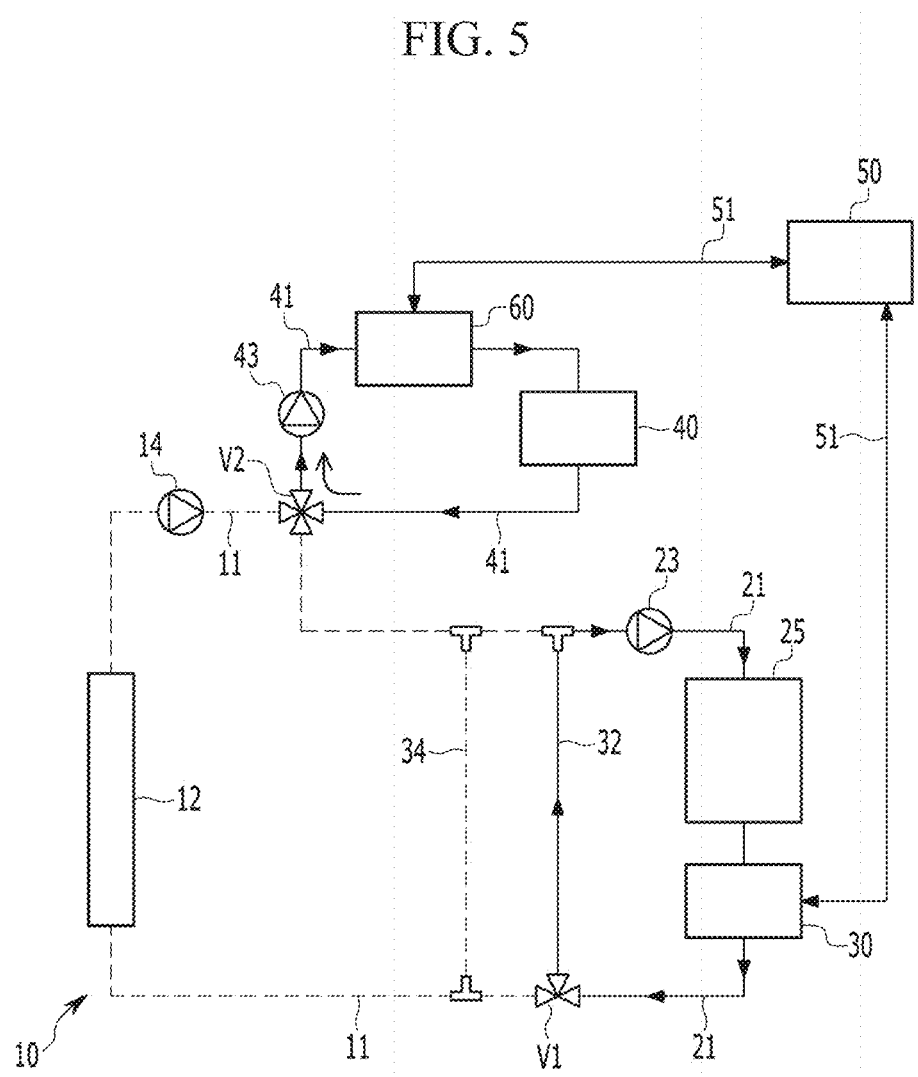
FIG. 5 is a view of an operation state according to a fourth cooling mode in a cooling system for a vehicle according to an embodiment of the present disclosure.

FIG. 5 is a view of an operation state depending on a fourth cooling mode in a cooling system for a vehicle according to an embodiment of the present disclosure.

Referring to FIG. 5, in the fourth cooling mode, the first branched line 32 is opened through the operation of the first valve V1. Also, the second branched line 34 is closed.

Accordingly, the battery coolant line 21 may form a closed and sealed circuit in which the coolant is independently circulated through the opened first branched line 32.

In other words, the coolant circulating along the battery coolant line 21 through the operation of the second water pump 23 passes through the first chiller 30. Then, the coolant passing through the first chiller 30 may circulate through the battery coolant line 21 and the first branched line 32 to cool the battery module 25.

Here, the first water pump 14 stops operation, i.e., in the cooling apparatus 10, the coolant may not circulate in the coolant line 11.

Meanwhile, the connection between the coolant line 11 and the coolant connection line 41 is closed so that the coolant connection line 41 forms an independent closed and sealed circuit through the operation of the second valve V2.

Accordingly, the coolant circulating along the coolant connection line 41 through the operation of the third water pump 43 passes through the second chiller 60. Then; the coolant passing through the second chiller 60 may circulate through the coolant connection line 41 to cool the automatic driving controller 40. Here, the air-conditioning apparatus 50 may open the refrigerant line 51 connected to the first chiller 30. At the same time; the air-conditioning apparatus 50 may open the refrigerant line 51 connected to the second chiller 60.

In other words; the first chiller 30 cools the coolant circulating through the battery coolant line 21 by using the refrigerant supplied from the air-conditioning apparatus 50 through the refrigerant line 51 and supplies it to the battery module 25.

Accordingly, the coolant circulating in the battery coolant line 21 is cooled through the heat-exchange with the refrigerant supplied to the first chiller 30. The coolant cooled in the first chiller 30 is supplied to the battery module 25. Accordingly, the battery module 25 is cooled by the cooled coolant.

The second chiller 60 cools the coolant circulating through the coolant connection line 41 by using the refrigerant supplied from the air-conditioning apparatus 50 through the refrigerant line 51 and supplies it to the automatic driving controller 40.

Accordingly, the coolant circulating in the coolant connection line 41 is cooled through the heat-exchange with the refrigerant supplied to the second chiller 60. The coolant cooled in the second chiller 60 is supplied to the automatic driving controller 40. Accordingly, the automatic driving controller 40 may be efficiently cooled by the cooled coolant.

In other words, the coolant passing through the first chiller 30 along the battery coolant line 21 and the first branched line 32 and the coolant passing through the second chiller 60 along the coolant connection line 41 may efficiently cool the battery module 25 and the automatic driving controller 40 while repeatedly performing the above-described operation.

On the other hand, in the present disclosure, the embodiment in which the cooling apparatus 10 is selectively connected to the battery module 25, the cooling apparatus 10 may be connected to a non-illustrated electrical component to supply the coolant.

Also, in the present embodiment, it is described that the automatic driving controller 40 is connected to the coolant line 11 through the second valve V2. However, the disclosure is not limited thereto, and the automatic driving controller 40 may be provided on the coolant line 11.

Accordingly, the cooling system for the vehicle as above-configured according to an embodiment of the present disclosure may efficiently cool the automatic driving controller 40 by using the coolant in communication with the cooling apparatus 10 circulating the coolant and the air-conditioning apparatus 50 circulating the refrigerant in an autonomous driving vehicle. The entire system and the layout of the piping are thereby simplified.

Also, by applying the first and second chillers 30 and 60 for lowering the temperature of the coolant by using the refrigerant circulating through the air-conditioning apparatus 50, the present disclosure may cool the battery module 25 and the automatic driving controller 40 more efficiently by using the low temperature coolant.

In addition, by efficiently cooling the battery module 25 or the automatic driving controller 40 by implementing the various cooling modes according to the temperature, the operation condition, or the external environment of each of the battery module 25 and the automatic driving controller 40 the present disclosure may improve the durability and performance of each constituent element.

Furthermore, the present disclosure may improve overall marketability of the vehicle and customer satisfaction.

While this disclosure has been described in connection with what is presently considered to be several practical embodiments, it should be understood that the disclosure is not limited to the disclosed embodiments. On the contrary, it is intended to cover various modifications and equivalent arrangements included within the spirit and scope of the appended claims.

DESCRIPTION OF SYMBOLS

10: cooling apparatus
11: coolant line
12: radiator
14: first water pump
21: battery coolant line
23: second water pump
25: battery module
30: first chiller
40: automatic driving controller
41: coolant connection line
43: third water pump
50: air-conditioning apparatus
51: refrigerant line
60: second chiller
V1, V2: first, second valve

What is claimed is:

1. A cooling system for a vehicle comprising:
a cooling apparatus including a radiator and a first water pump connected by a coolant line and circulating a coolant to the coolant line;
a battery module provided on a battery coolant line selectively connected to the coolant line through a first valve;
a first chiller provided on the battery coolant line between the first valve and the battery module, and connected to a refrigerant line of an air-conditioning apparatus, the first chiller configured to heat-exchange the selective inflowed coolant with the refrigerant supplied from the air-conditioning apparatus to adjust a temperature of the coolant;
an automatic driving controller connected to the coolant line so that the coolant is circulated inside;
a first branched line selectively connecting the battery coolant line through the operation of the first valve so that the first chiller and the battery module form an independent closed and sealed circuit through the battery coolant line; and
a second branched line selectively dividing the coolant line and the battery coolant line,
wherein the battery module or the automatic driving controller is cooled selectively by at least one cooling mode,
wherein one end of the second branched line is connected to the coolant line between the radiator and the first valve, and
wherein another end of the second branched line is connected to the coolant line between the first water pump and the first branched line.

2. The cooling system for the vehicle of claim 1, wherein one end of the first branched line is connected to the first valve, and
another end of the first branched line is connected to a position where the coolant line and the battery coolant line are connected between the second branched line and the battery module.

3. The cooling system for the vehicle of claim 1, wherein the automatic driving controller is provided on a coolant connection line connected to the coolant line through a second valve.

4. The cooling system for the vehicle of claim 3, wherein at least one cooling mode includes:
a first cooling mode cooling both the battery module and the automatic driving controller by using the coolant cooled in the radiator;
a second cooling mode cooling the automatic driving controller by using the coolant cooled in the radiator and cooling the battery module by using the coolant cooled in the first chiller; and
a third cooling mode cooling the battery module by using the coolant cooled in the radiator and independently cooling the automatic driving controller.

5. The cooling system for the vehicle of claim 4, wherein in the first cooling mode,
the first branched line is closed through the operation of the first valve,
the second branched line is closed,
the coolant line and the battery coolant line are mutually connected, and
the coolant line and the coolant connection line are connected through the operation of the second valve.

6. The cooling system for the vehicle of claim 4, wherein in the second cooling mode,
the first branched line is opened through the operation of the first valve,
the second branched line is opened,
the connection of the coolant line and the battery coolant line is closed by the opened first and second branched lines,
the opened first branched line is connected to the battery coolant line to form an independent closed and sealed circuit, and
the coolant line and the coolant connection line are connected through the operation of the second valve.

7. The cooling system for the vehicle of claim 4, wherein in the third cooling mode,
the first branched line is closed through the operation of the first valve,
the second branched line is closed,
the coolant line and the battery coolant line are mutually connected, and
the connection of the coolant line and the coolant connection line is closed so that each of the coolant line and the coolant connection line forms an independent closed and sealed circuit through the operation of the second valve.

8. The cooling system for the vehicle of claim 3, wherein a second water pump is provided in the battery coolant line.

9. The cooling system for the vehicle of claim 4, wherein a third water pump is provided in the coolant connection line between the second valve and the automatic driving controller.

10. The cooling system for the vehicle of claim 9, wherein a second chiller connected to the air-conditioning apparatus through the refrigerant line is provided on the coolant connection line between the third water pump and the automatic driving controller.

11. The cooling system for the vehicle of claim 10, wherein
at least one cooling mode further includes a fourth cooling mode cooling the battery module by using the coolant cooled in the first chiller and cooling the automatic driving controller by using the coolant cooled in the second chiller.

12. The cooling system for the vehicle of claim 11, wherein
in the fourth cooling mode,
the first branched line is opened through the operation of the first valve,
the second branched line is closed,
the connection of the coolant line and the coolant connection line is closed through the operation of the second valve,
the opened first branched line is connected to the battery coolant line to form an independent closed and sealed circuit,
the coolant connection line forms an independent closed and sealed circuit,
the first chiller cools the coolant circulating through the battery coolant line by using the refrigerant supplied through the refrigerant line from the air-conditioning apparatus to be supplied to the battery module, and
the second chiller cools the coolant circulating through the coolant connection line by using the refrigerant supplied from the air-conditioning apparatus through the refrigerant line to be supplied to the automatic driving controller.

13. The cooling system for the vehicle of claim 10, wherein
in the second cooling mode, the air-conditioning apparatus opens the refrigerant line connected to the first chiller and closes the refrigerant line connected to the second chiller.

14. The cooling system for the vehicle of claim 10, wherein
in the third cooling mode, the air-conditioning apparatus closes the refrigerant line connected to the first chiller and opens the refrigerant line connected to the second chiller.

15. The cooling system for the vehicle of claim 10, wherein
the first and second chillers are each a heat-exchanger of a water-cooled type.

16. The cooling system for the vehicle of claim 3, wherein
the first valve is a 3-way valve, and
the second valve is a 4-way valve.

17. A cooling system for a vehicle, the cooling system comprising:
a cooling apparatus including a radiator and a first water pump connected by a coolant line and circulating a coolant to the coolant line;
a battery module provided on a battery coolant line selectively connected to the coolant line through a first valve;
a first chiller provided on the battery coolant line between the first valve and the battery module, and connected to a refrigerant line of an air-conditioning apparatus, the first chiller configured to heat-exchange the selective inflowed coolant with the refrigerant supplied from the air-conditioning apparatus to adjust a temperature of the coolant;
an automatic driving controller connected to the coolant line so that the coolant is circulated inside;
a first branched line selectively connecting the battery coolant line through the operation of the first valve so that the first chiller and the battery module form an independent closed and sealed circuit through the battery coolant line; and
a second branched line selectively dividing the coolant line and the battery coolant line,
wherein the battery module or the automatic driving controller is cooled selectively by at least one cooling mode,
wherein the automatic driving controller is provided on a coolant connection line connected to the coolant line through a second valve, and
wherein at least one cooling mode includes:
a first cooling mode cooling both the battery module and the automatic driving controller by using the coolant cooled in the radiator;
a second cooling mode cooling the automatic driving controller by using the coolant cooled in the radiator and cooling the battery module by using the coolant cooled in the first chiller; and
a third cooling mode cooling the battery module by using the coolant cooled in the radiator and independently cooling the automatic driving controller.

* * * * *